(12) United States Patent
Kishioka et al.

(10) Patent No.: US 8,537,304 B2
(45) Date of Patent: Sep. 17, 2013

(54) LIQUID CRYSTAL DISPLAY DEVICE AND MANUFACTURING METHOD THEREFOR

(75) Inventors: Atsushi Kishioka, Yokohama (JP); Shinji Sekiguchi, Kawasaki (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 529 days.

(21) Appl. No.: 12/778,453

(22) Filed: May 12, 2010

(65) Prior Publication Data

US 2010/0289984 A1    Nov. 18, 2010

(30) Foreign Application Priority Data

May 13, 2009   (JP) .................................. 2009-116080

(51) Int. Cl.
*G02F 1/1335*   (2006.01)

(52) U.S. Cl.
USPC ............... 349/62; 349/64; 349/114; 349/95; 345/88; 362/97.1; 427/58; 428/474.4; 428/910

(58) Field of Classification Search
USPC ............ 349/62, 64, 114, 95; 359/618, 619, 359/670; 427/58; 428/474.4, 910
See application file for complete search history.

(56) References Cited

U.S. PATENT DOCUMENTS

| | | | | |
|---|---|---|---|---|
| 6,628,355 | B1* | 9/2003 | Takahara | 349/106 |
| 7,289,257 | B1* | 10/2007 | Nakagoshi | 359/241 |
| 8,039,065 | B2* | 10/2011 | Ikeda et al. | 428/1.32 |
| 2006/0187379 | A1* | 8/2006 | Yamanaka et al. | 349/95 |
| 2007/0013830 | A1 | 1/2007 | Hayakawa | |
| 2007/0046860 | A1* | 3/2007 | Daiku | 349/68 |
| 2008/0074564 | A1* | 3/2008 | Uehara et al. | 349/5 |
| 2008/0218461 | A1* | 9/2008 | Sugita et al. | 345/88 |
| 2008/0259230 | A1* | 10/2008 | Miyakita et al. | 349/8 |
| 2009/0066880 | A1* | 3/2009 | Sugita et al. | 349/64 |
| 2009/0115939 | A1 | 5/2009 | Ikuta et al. | |
| 2011/0102892 | A1* | 5/2011 | Yanagita | 359/487.02 |

FOREIGN PATENT DOCUMENTS

| | | |
|---|---|---|
| EP | 0 645 661 | 3/1995 |
| JP | 2003-255318 | 9/2003 |
| JP | 2003-337327 | 11/2003 |

(Continued)

OTHER PUBLICATIONS

Bobrov, Y et al; "Thin Film Polarizers for Liquid Crystal Displays", Proceedings of SPIE, SPIE, US, vol. 4511, Jan. 1, 2001; pp. 133-140, XP001063391, Section 1, Figure 9.

*Primary Examiner* — Edward Glick
*Assistant Examiner* — Sang V Nguyen
(74) *Attorney, Agent, or Firm* — Antonelli, Terry, Stout & Kraus, LLP.

(57) ABSTRACT

The liquid crystal display device includes: a liquid crystal panel in which liquid crystal is held in a cell between a first substrate and second substrate opposed to each other, an illumination device which is placed on a side of the first substrate of the liquid crystal panel; a polarization layer containing a dichroic dye that has lyotropic liquid crystal properties which is formed by application on a surface of the first substrate of the liquid crystal panel that is opposite from the liquid crystal; and a condenser lens which condenses light from the illumination device to an interior of the cell, and/or a resin layer which protects the polarization layer, which are disposed on a top surface of the polarization layer.

17 Claims, 9 Drawing Sheets

(56) References Cited

FOREIGN PATENT DOCUMENTS

| | | |
|---|---|---|
| JP | 2004-348043 | 12/2004 |
| JP | 2005-10329 | 1/2005 |
| JP | 2006-284735 | 10/2006 |
| JP | 2007-025458 | 2/2007 |
| JP | 2007-133037 | 5/2007 |
| JP | 2008-129177 | 6/2008 |
| JP | 2008-304523 | 12/2008 |
| JP | 2009-157033 | 7/2009 |

* cited by examiner

LIQUID CRYSTAL DISPLAY DEVICE AND MANUFACTURING METHOD THEREFOR

CROSS-REFERENCE TO RELATED APPLICATION

The present application claims priority from Japanese application JP 2009-116080 filed on May 13, 2009, the content of which is hereby incorporated by reference into this application.

BACKGROUND OF THE INVENTION

1. Field of the Invention

The present invention relates to a liquid crystal display device and a manufacturing method therefor, and in particular, a liquid crystal display device including a condenser lens and a manufacturing method therefor.

2. Description of the Related Art

In recent years, in-plane switching (IPS) and vertical alignment (VA) transmissive liquid crystal display devices having a wide viewing angle are widely in use for monitors for various apparatuses and televisions. In addition, liquid crystal display devices are widely used for portable information apparatuses, including portable phones and digital cameras, because the liquid crystal display devices are light-weight. However, further reduction in the thickness and weight are required for display devices for portable information apparatuses, as portable information apparatuses are getting lighter. The thickness of most liquid crystal display devices for portable information apparatuses is reduced during a manufacturing process, by polishing a glass substrate of a liquid crystal panel. Methods of polishing glass substrates generally include chemical polishing using hydrofluoric acid or the like, and mechanical polishing of physically polishing using an abrasive.

In addition, display devices for portable information apparatuses are used in various environments in terms of brightness, including outdoors in clear weather and in dark indoors. For this reason, transflective liquid crystal display devices having a reflective display portion and a transmissive display portion in each pixel have been developed. In the transflective liquid crystal display devices, the transmissive display portions display an image using a backlight, similarly to conventional liquid crystal display panels, and the reflective display portions use reflection of external light for display. However, the backlight is blocked in the reflective display portions, and therefore, there is a problem that the numerical aperture is small in comparison with total transmissive liquid crystal display devices.

The resolution of the liquid crystal display devices for portable information apparatuses has been increasing together with opportunities for one segment reception service for digital terrestrial broadcasting for portable phones and mobile terminals and high-resolution photography. There is a limit to the size of thin film transistors for driving liquid crystal and miniaturization of the width of wires, and hence an area occupied by wires of a substrate (TFT substrate) on which a thin film transistor (TFT) is formed becomes larger as the resolution increases. Wires are formed of such materials as metals which do not transmit light, and therefore block the backlight. Therefore, the area of the aperture through which light transmits becomes smaller as the resolution increases.

As described above, the ratio of light from the backlight which transmits to the front of the display device tends to decrease in display devices for portable information apparatuses. As a method of avoiding this problem, there is a technology for forming condenser lenses on outer surface of the TFT substrate so that light from the backlight is condensed in the light aperture, and thus, light from the backlight which would otherwise be blocked by the wires of the TFT substrate and the reflective portion may be used effectively.

Documents related to the invention of this application include JP2003-337327A, JP2008-304523A, JP2007-25458A, and JP2007-133037A. JP 2003-337327 A discloses a liquid crystal display device in which a condenser plate with a row of condenser lenses for condensing light from a backlight to apertures in pixel electrodes is stuck to a backlight side of a liquid crystal panel. However, because the condenser plate has the thickness of its base in addition to that of the condenser lenses, forming just lenses on a liquid crystal panel is a superior method from the standpoint of making a display device thinner. JP 2008-304523 A discloses a structure in which condenser lenses are formed directly on a polarization film by offset printing. JP 2007-25458 A discloses a technology of forming condenser lenses directly on an outer surface of a liquid crystal panel, without the intervening polarization film, by photolithography that utilizes a pixel matrix pattern of the liquid crystal panel. Several other technologies of forming lenses directly are known, including mold transcribing methods, ink jet methods, printing methods such as intaglio offset printing, and photolithography-based methods. JP 2007-133037 A discloses a method in which, after condenser lenses are formed directly on an outer surface of a liquid crystal panel, a plurality of protrusions provided at the peaks of the lenses are used as supporters to mount a polarization film.

In the case where condenser lenses are formed on a polarization film stuck to a liquid crystal panel, the polarization film expands and contracts when heated or when the humidity changes, and accordingly causes a change in lens shape or lens pitch, thereby affecting the display performance. Further, optical design puts limitations on the distance from the condenser lenses to light apertures, which makes the thickness of the polarization film an issue in some cases.

In the case where condenser lenses are formed directly on a liquid crystal panel without the intervening polarization film, on the other hand, where to mount a polarization film is an issue. A polarization film is mounted to a liquid crystal panel by sticking a polarization film with an adhesive to an outer surface of the liquid crystal panel. However, in the case where condenser lenses are formed on the outer surface of the liquid crystal panel, the polarization film is stuck onto the condenser lenses and gaps between the condenser lenses are filled with the adhesive of the polarization film. With the adhesive filling the gaps, the condenser lenses which exert a light condensing function by utilizing a difference between a refractive index of air acting as a medium of light and a refractive index of the condenser lenses is significantly lowered in the light condensing function due to a reduced difference in refractive index. The light condensing function may be maintained to some degree by employing a method that increases the refractive index difference between the condenser lenses and the adhesive, or a method in which the gaps between the lenses are filled with a material whose refractive index is high relative to the condenser lenses and then a polarization film is stuck onto the lenses. Still, the lowering of the light condensing function is unavoidable.

In the case where a polarization film is stuck to the backlight side, too, attaching a polarization film to a prism sheet of a backlight which is processed to have a three-dimensional surface in order to guide light lowers the function of the prism sheet for the same reason as described above. Further, because a prism sheet in general is a thin sheet, the expansion and contraction of a polarization film stuck to a prism sheet deforms the prism sheet and may cause a display error.

JP 2007-133037 A discloses a method in which, after condenser lenses are formed directly on an outer surface of a liquid crystal panel, a plurality of protrusions provided at the peaks of the lenses are used as supporters to mount a polarization film. This method may fix a polarization film more firmly than in a structure that uses adhesive layers provided selectively in the perimeter of a liquid crystal panel to stick a polarization film. On the other hand, the method involves a laborious manufacturing process and, due to an air layer held between the liquid crystal panel and the polarization film, creates more interfaces than in a structure where a polarization film is stuck directly to a liquid crystal panel. Accordingly, more light is reflected at interfaces before light from a backlight reaches the front surface of the liquid crystal panel, and the luminance may be lowered as a result.

SUMMARY OF THE INVENTION

It is therefore an object of the present invention to provide a liquid crystal display device having excellent light condensing characteristics and capable of avoiding interface reflection, and a method of manufacturing the liquid crystal display device.

A liquid crystal display device according to the present invention includes, for example: a liquid crystal panel in which liquid crystal is held in a cell between a first substrate and a second substrate opposed to each other; an illumination device which is placed on a side of the first substrate of the liquid crystal panel; a polarization layer containing a dichroic dye that has lyotropic liquid crystal properties, which is formed by application on a surface of the first substrate of the liquid crystal panel that is opposite from the liquid crystal; and one of a condenser lens which condenses light from the illumination device to an interior of the cell, and a resin layer, which is formed on a top surface of the polarization layer.

A liquid crystal display device manufacturing method according to the present invention is a method of manufacturing a liquid crystal display device that includes, for example: a liquid crystal panel; and an illumination device, the liquid crystal panel holding liquid crystal in a cell between a first substrate and a second substrate which are opposed to each other, the illumination device being placed on a side of the first substrate of the liquid crystal panel, the method including: forming, by application, a polarization layer containing a dichroic dye that has lyotropic liquid crystal properties on a surface of the first substrate of the liquid crystal panel that is opposite from the liquid crystal; and forming one of a condenser lens which condenses light from the illumination device to an interior of the cell, and a resin layer on a top surface of the polarization layer.

The structures described above are merely examples, and the present invention may be modified suitably to the extent that does not depart from its technical concept. Other structural examples of the present invention than those described above become clear by reading the specification of the invention of this application in its entirety in conjunction with the accompanying drawings.

According to the above-mentioned liquid crystal display device and manufacturing method therefor, a condenser lens is placed in a manner that gives the condenser lens excellent light condensing characteristics and avoids interface reflection.

Other effects of the present invention become clear from the entire specification of the present invention.

DETAILED DESCRIPTION OF THE INVENTION

Embodiments of the present invention are described with reference to the drawings. Throughout the drawings and the embodiments, identical or similar components are denoted by the same reference symbol in order to avoid a repetitive description.

First Embodiment

Figure 1:
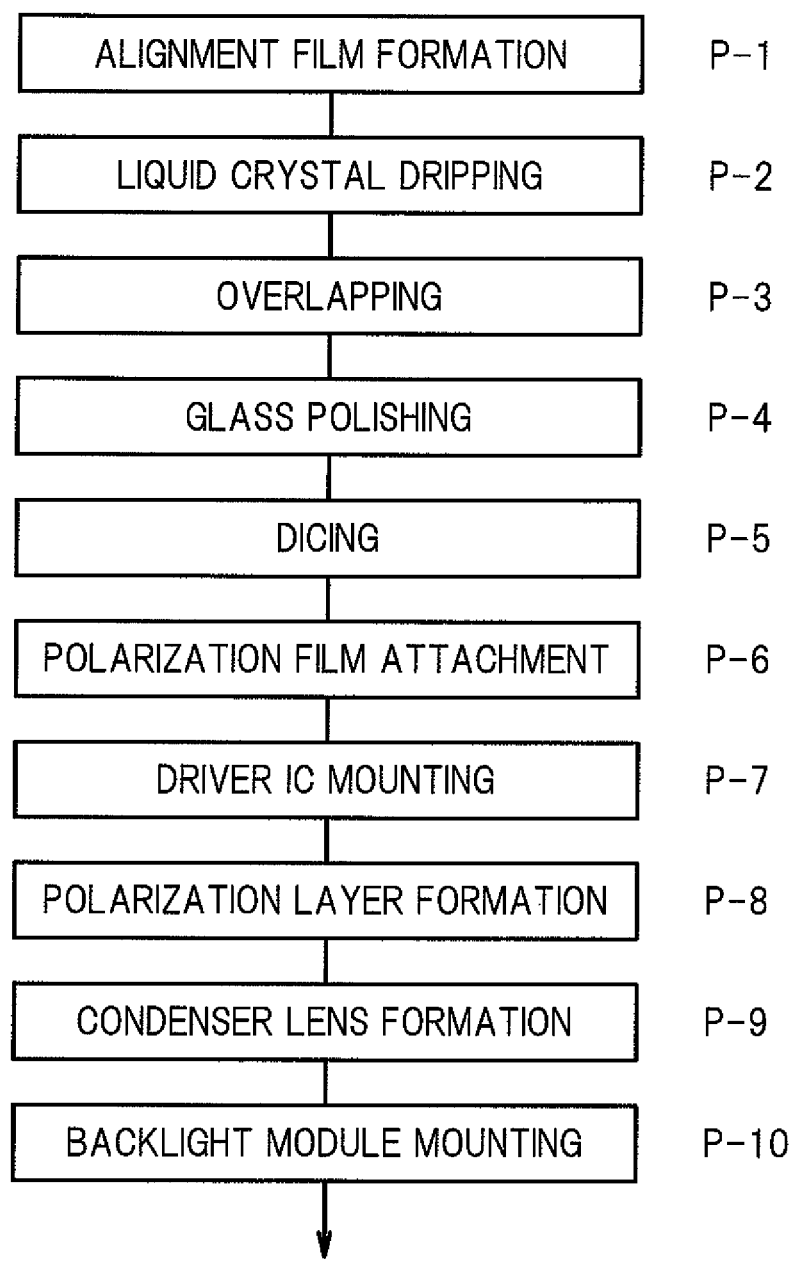
FIG. 1 is a process flow diagram illustrating a manufacturing method for a liquid crystal display device according to a first embodiment of the present invention.
Figure 2:
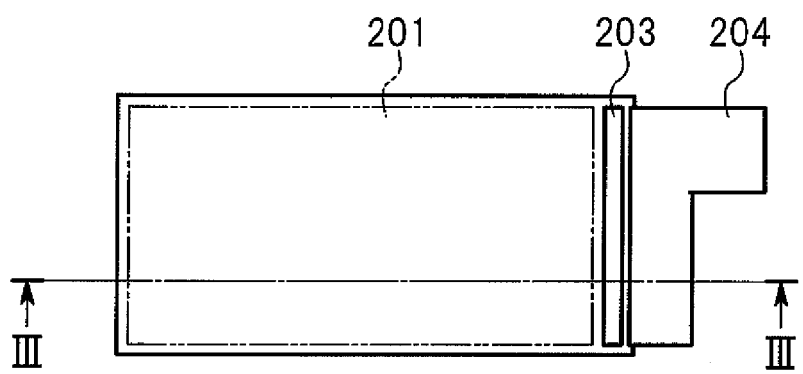
FIG. 2 is a schematic plan view illustrating the liquid crystal display device for a portable apparatus that is manufactured by the method of the present invention.
Figure 3:
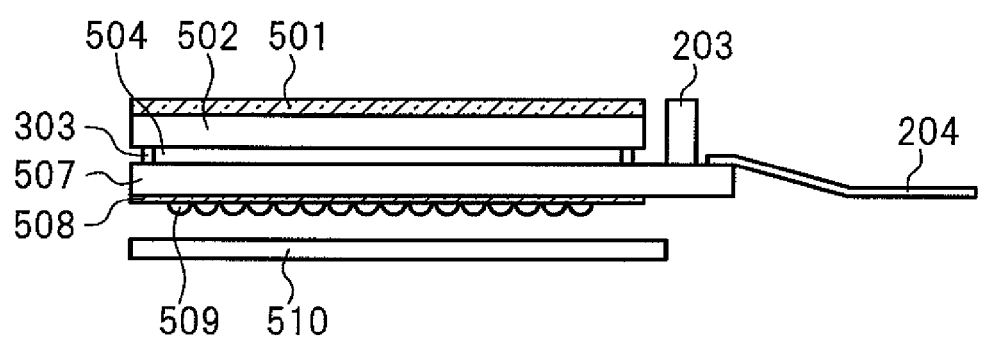
FIG. 3 is a sectional view taken along the line III-III of FIG. 2.
Figure 4:
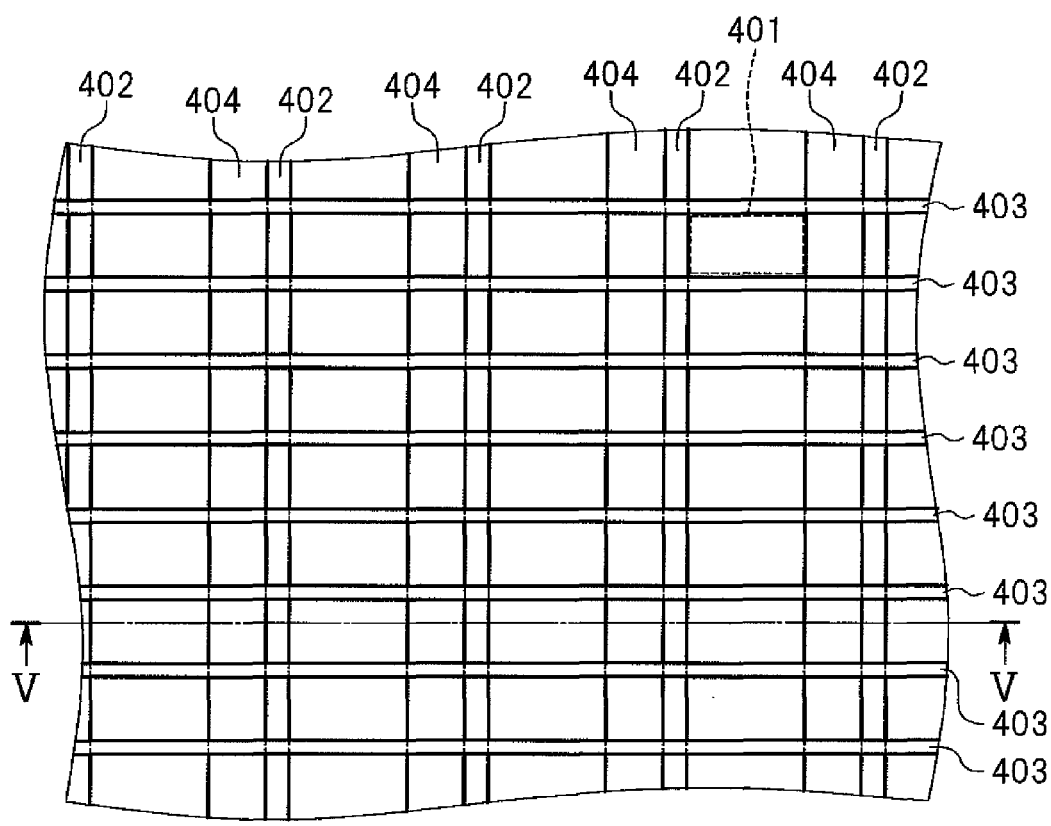
FIG. 4 is a plan view illustrating an effective display region of FIG. 2 enlarged.

FIG. 1 illustrates a process flow of a manufacturing method for a liquid crystal display device according to a first embodiment of the present invention. FIG. 2 is a plan view of a liquid crystal display device that is manufactured through this process flow (transflective liquid crystal display device for a portable apparatus). FIG. 3 is a sectional view taken along the line III-III of FIG. 2. FIG. 4 is an enlarged plan view of the liquid crystal display device in an effective display region

Figure 5:
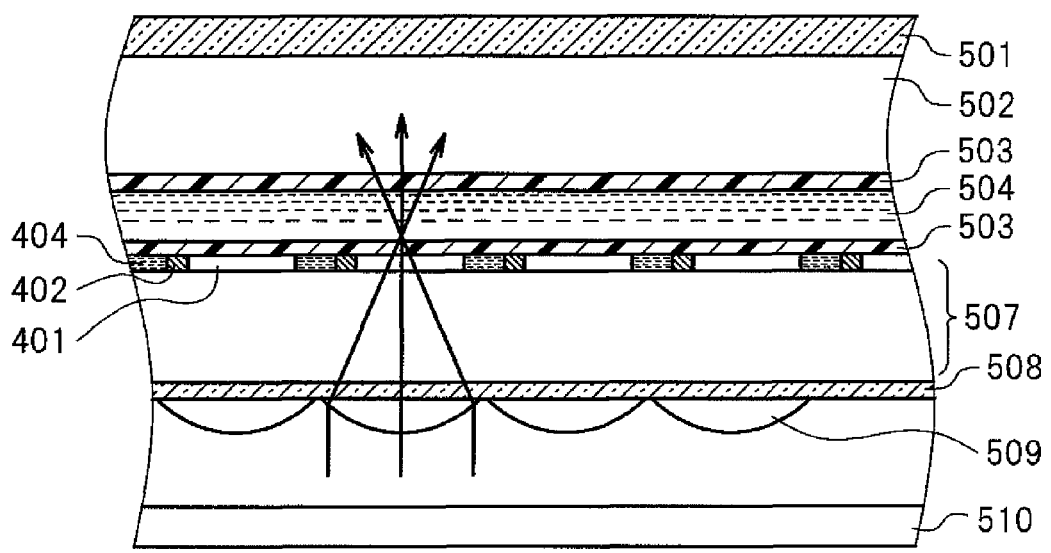
FIG. 5 is a sectional view taken along the line V-V of FIG. 4 to illustrate the liquid crystal display device according to the first embodiment of the present invention.
Figure 9:
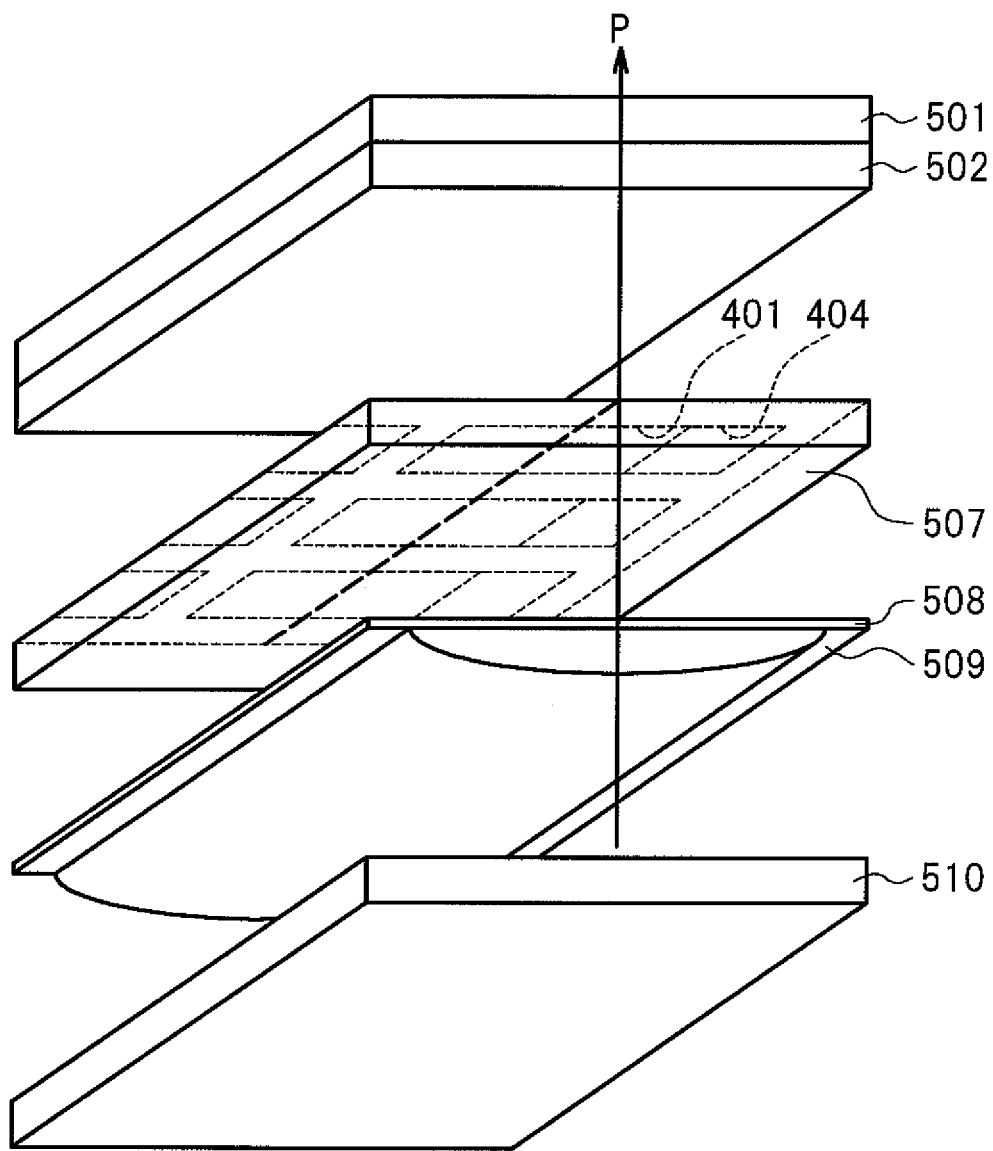
FIG. 9 is an exploded perspective view of a liquid crystal display device of the present invention in an effective display region.

201. FIG. 5 is a sectional view taken along the line V-V of FIG. 4. FIG. 9 is an exploded perspective view of the liquid crystal display device.

The manufacturing method for a liquid crystal display device according to an embodiment of the present invention is described in reference to the drawings. First, an alignment film 503 (see FIG. 5) which functions to align molecules of liquid crystal 504 is formed on main surfaces of a TFT substrate 507 (see FIG. 5) and a color filter substrate 502 (see FIG. 5) (FIG. 1, P-1).

The TFT substrate 507 and the color filter substrate 502 constitute a cell which holds the liquid crystal 504, with the TFT substrate 507 serving as a substrate on which a thin-film transistor (TFT) and other components are formed and the color filter substrate 502 serving as a substrate on which a color filter is formed. The liquid crystal 504 between the TFT substrate 507 and the color filter substrate 502 is sealed by a sealing material 303 (see FIG. 3).

A wire layer is formed on the TFT substrate 507 on the side of the liquid crystal 504. The wire layer includes scan lines 403 (see FIG. 4) and signal lines 402 (see FIG. 4) which intersect each other. The scan lines 403 and the signal lines 402 surround a pixel region (sub-pixel region) in which a pixel electrode (not shown) formed from a transparent electrode is disposed. Each pixel electrode is disposed to face one of color resists (red (R), green (G), and blue (B)) of the color filter substrate 502. Each pixel electrode is connected to a thin-film transistor TFT (not shown) (hereinafter, may simply be referred to as TFT), which is formed at each intersection between one scan line 403 and one signal line 402. The scan line 403 is connected to a gate electrode of the TFT and the signal line 402 is connected to a source/drain electrode of the TFT. An external light reflecting layer which reflects external light is formed in a reflective display portion 404.

A black matrix and the color resists (red (R), green (G), and blue (B)) which are formed in the pixel regions (sub-pixel regions) divided in matrix by the black matrix are formed so that color pixels are formed on the surface on the liquid crystal 504 side of the color filter substrate 502.

It should be noted that, a general multiple panel taking system is used in the liquid crystal panel mass production line, and thus, a large number of panels having a display effective surface are arranged within the surface of a substrate, to thereby mass produce a plurality of liquid crystal panels from a color filter substrate and a TFT substrate large in size.

In the step of forming the alignment film 503 described above (FIG. 1, P-1), a polyimide film is formed on the surface of the TFT substrate 507 and the color filter substrate 502, and after that a rubbing process for rubbing the surface of the polyimide with a roller around which a cloth is wrapped is carried out. Here, it is not necessary for the material of the alignment film 503 to be polyimide, and in the method for the alignment process, a method using energy, for example, an ion beam or ultraviolet rays, or a method for structurally processing the surface may be used.

Next, the sealing material 303 is applied around the outer periphery of the effective pixel region on the surface of the color filter substrate 502 on which the alignment film 503 is formed, and appropriate amount of liquid crystal is dropped in the effective pixel region on the color filter substrate 502 (FIG. 1, P-2). The TFT substrate 507 is layered on top of this in such a manner that the alignment film 503 of the TFT substrate 507 faces the alignment film 503 of the color filter substrate 502 (FIG. 1, P-3). In this step of sealing liquid crystal, a method referred to as "liquid crystal drop method" is used, but the method is not limited to this, and a so-called vacuum fill method may be used. After that, outer surfaces (surfaces on the opposite side of the liquid crystal 504) of the TFT substrate 507 and the color filter substrate 502 are polished to a thickness of as little as 149.7 μm (FIG. 1, P-4), and the substrates are cut into panels (FIG. 1, P-5). In this embodiment, glass is used as the substrate, however, a plastic substrate or the like may also be used, and a film having a thickness observing the optical design of the liquid crystal panel may also be used without polishing. A polarization film 501 is affixed to the outer surface (surface of the opposite side of the liquid crystal 504) of the color filter substrate 502 (FIG. 1, P-6), and a driver IC 203 and a flexible printed circuit board 204 are mounted (FIG. 1, P-7).

A polarization layer 508 (see FIG. 5) is then formed from a dichroic dye that has lyotropic liquid crystal properties to a thickness of 0.01 μm to 10 μm (preferably to a thickness of 0.3 μm) (FIG. 1, P-8). The polarization layer 508 may be formed by, for example, using as a lyotropic mesogen a solution that contains C. I. Direct Blue 67 (a product of NIPPON KAYAKU Co., Ltd.) and applying the solution. Other materials that may be used to form the polarization layer 508 than the above include, but are not limited to, solutions containing lyotropic mesogens that have molecular structures expressed by the following structural formulae (3) to (20).

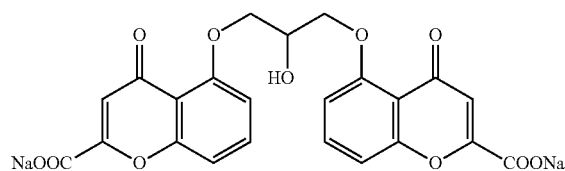

(3)

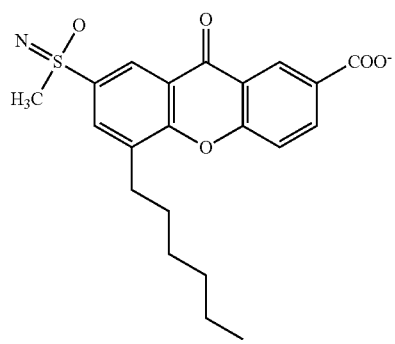

(4)

-continued
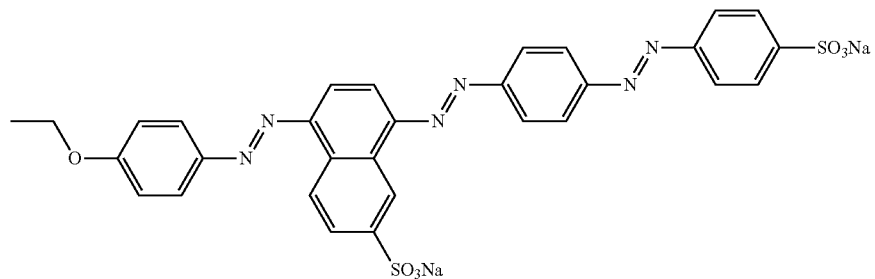
(5)
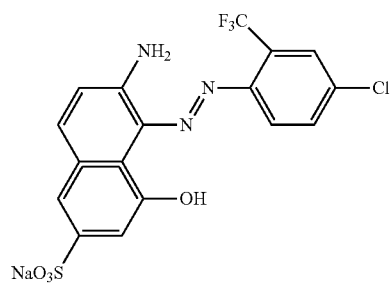
(6)
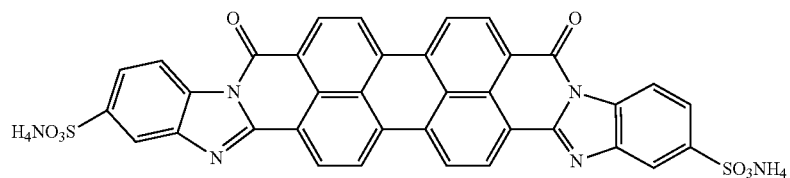
(7)
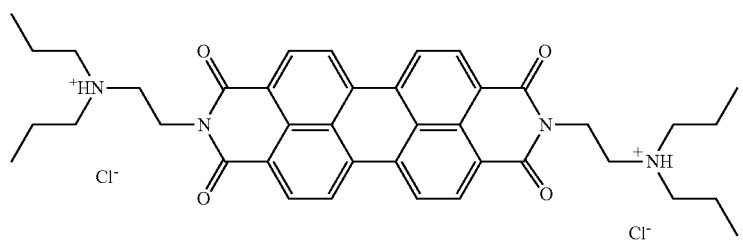
(8)
⑦ indicates text missing or illegible when filed
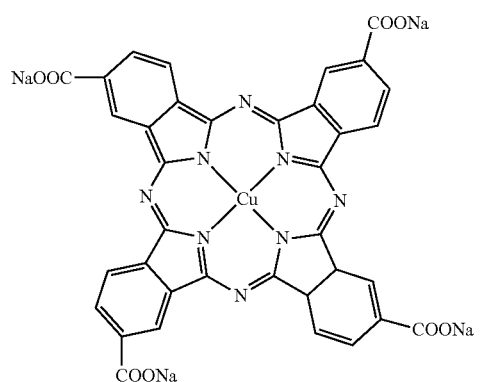
(9)
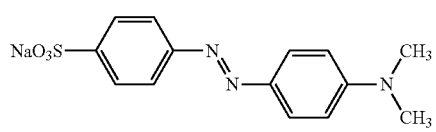
(10)

-continued
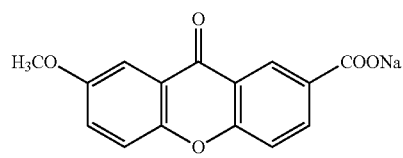
(11)
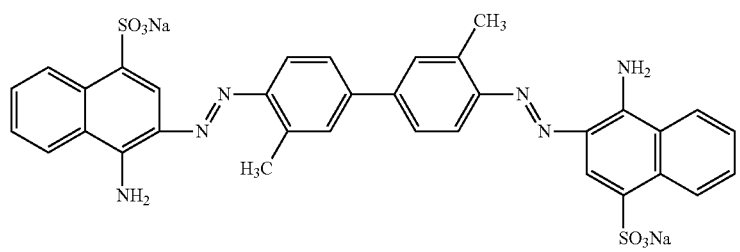
(12)
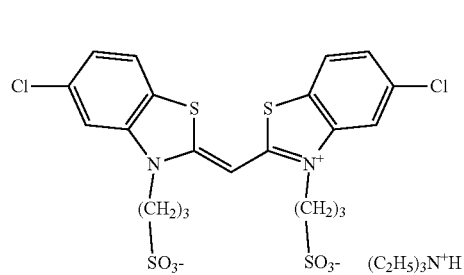
(13)
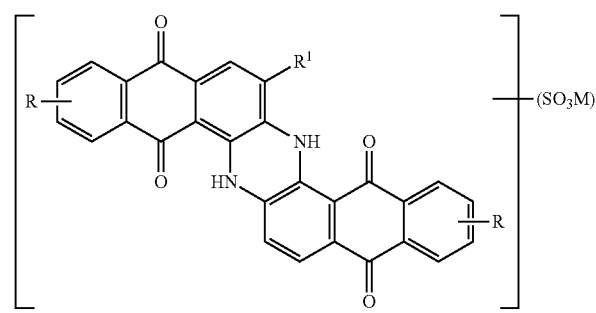
(14)
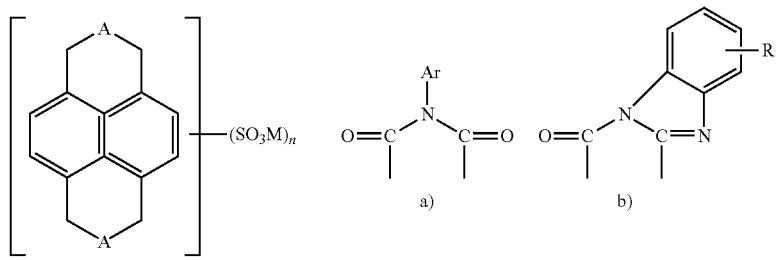
(15)
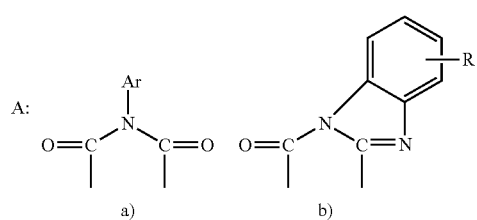
(15)

In Structural Formula (14), M represents a cation, R1 represents H or Cl, R represents H, an alkyl group, ArNH, or ArCONH, and Ar represents a substituted or unsubstituted aryl group. In Structural. Formula (15), M represents a cation, R represents H, an alkyl group, a halogen, or an alkoxy group, Ar represents a substituted or unsubstituted aryl group, and n represents 2 or 3.

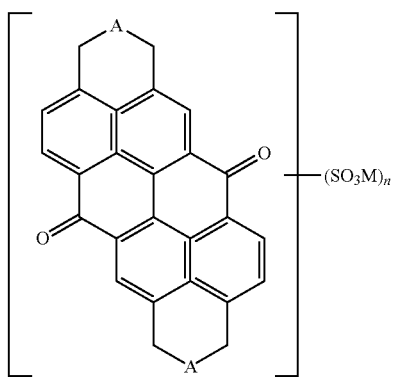
(16)

A:
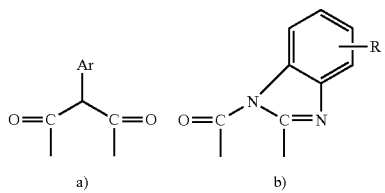
a)  b)

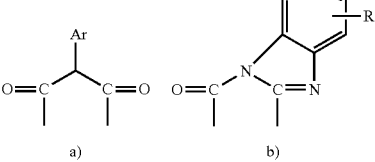
a)  b)

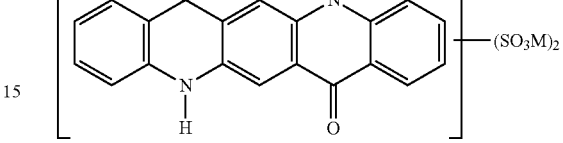
(19)

In Structural Formula (18), M represents a cation, R represents H, an alkyl group, a halogen, or an alkoxy group, Ar represents a substituted or unsubstituted aryl group, and n represents 2 or 3. In Structural Formula (19), M represents a cation.

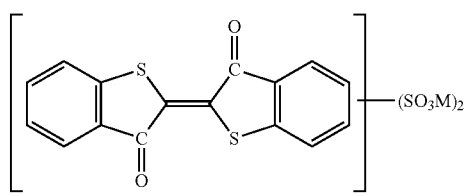
(17)

In Structural Formula (16), M represents a cation, R represents H, an alkyl group, a halogen, or an alkoxy group, Ar represents a substituted or unsubstituted aryl group, and n represents 2 or 3. In Structural Formula (17), M represents a cation.

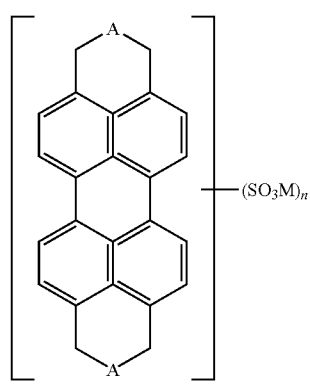
(18)

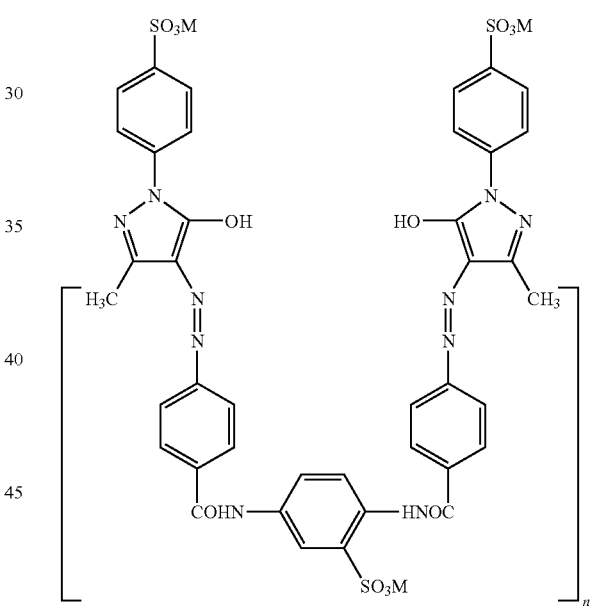
(20)

In Structural Formula (20), M represents a cation and n represents 3, 4, or 5.

The polarization layer 508 is favorably applied by, for example, a slit dye coater. A slit dye coater is capable of arranging a polarization layer material in an application direction while supplying the polarization layer material in a solution state to a surface to be applied. Molecules of the material are aligned through this step and then dried and solidified, thereby forming the polarization layer 508.

After that, condenser lenses 509 are formed by, for example, intaglio offset printing (FIG. 1, P-9). A backlight module 510 is mounted in the side of the condenser lenses 509 (FIG. 1, P-10), and thus a liquid crystal display device with a backlight is completed. Light emitted from this backlight module is collimated such that an angle at which the light intensity is 50% is ±8° with respect to one axis. This is because the condenser lenses 509 may not condense light when light from the backlight is not collimated at all. It is therefore preferred to use a backlight whose light is collimated such that an angle at which the light intensity is 50% is within ±15° with respect to at least one axis. Light emitted from the backlight may also be polarized. The utilization efficiency of the light rises by matching a polarization direction of the light with the polarization axis of the polarization layer. It also supplements the degree of polarization of the polarization layer 508 in the case where light is not polarized enough by the polarization layer 508. The liquid crystal display device of this embodiment is designed to set 150 μm to the distance between the condenser lenses 509 and apertures in the TFT substrate 507 through which light is transmitted.

When a liquid crystal panel is manufactured through the process described above, the combined thickness of the TFT substrate 507, 149.7 μm, and the polarization layer, 0.3 μm, is 150 μm, which is the designed value.

The mass-production of a liquid crystal panel polished down to a substrate thickness of 100 μm or less is in general difficult. Polarization films, on the other hand, have a thickness of approximately 100 μm. When the distance to the apertures is designed to be 150 μm as in this embodiment, the glass substrate thickness has to be reduced to 50 μm in order to stick a polarization film to the TFT substrate 507 and form condenser lenses on the polarization film, thus making it difficult to mass-produce the liquid crystal panel steadily. In addition, a polarization film which is manufactured generally by stretching a film expands and contracts when heated or moisturized. The pitch between condenser lenses formed on a polarization film therefore is changed by the expansion and contraction of the polarization film. For the above-mentioned reasons, a structure in which condenser lenses are formed on a polarization film is inconvenient in terms of performance.

The substrate thickness after polishing and the thickness of the polarization layer 508 are not limited to the numerical values given in this embodiment, and are desirably determined by the optical design of the liquid crystal display device.

In the present invention, the polarization layer 508 containing a dichroic dye that has lyotropic liquid crystal properties is formed instead of a polarization film. The polarization layer 508 may be formed thinner than a polarization film, and expands and contracts little. The problems described above are therefore remedied and the condenser lenses 509 may be formed on the top surface of the polarization layer 508. All the issues of mounting a polarization film are thus eliminated.

The intaglio offset printing used to form the condenser lenses 509 is now described. FIGS. 6A to 6E are schematic diagrams of the step of forming the condenser lenses 509 by intaglio offset printing (FIG. 1, P-9). First, an intaglio 602 and a liquid crystal panel 605 are fixed to a bed of an offset printer. The liquid crystal panel 605 has finished up through the forming of the polarization layer 508 (FIG. 1, P-8), and is fixed with the polarization layer 508 as the top surface.

The intaglio 602 has recesses 604 formed therein which correspond to the pattern of the condenser lenses 509 (lens pattern). The height and width of the condenser lenses 509 formed may be adjusted by adjusting the depth and width of the recesses 604.

Figure 6A:
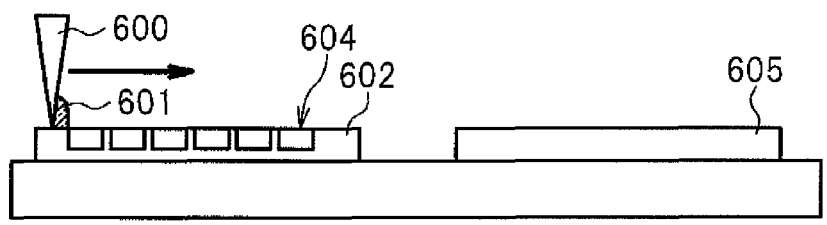
FIG. 6A is a diagram illustrating one of steps of forming condenser lenses by intaglio offset printing.
Figure 6B:
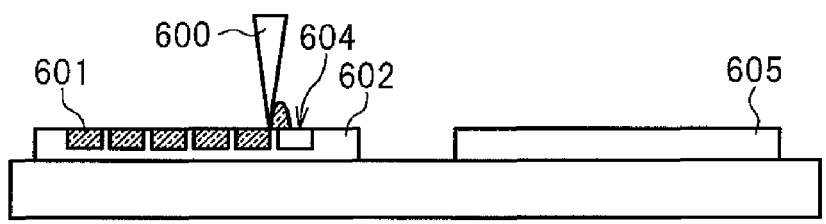
FIG. 6B is a diagram illustrating one of the steps of forming condenser lenses by intaglio offset printing.

Next, as illustrated in FIGS. 6A and 6B, a lens material 601 is put on the intaglio 602 and scraped off by a doctor blade 600, thereby filling the recesses 604 in the intaglio. The lens material 601 may be one of a UV curable resin material, a thermocurable resin material, and an air-dry hardening material, or a combination of two or more of those materials. A material containing a UV curable resin material or a material containing an air-dry hardening material is desirable. More desirably, a material containing a UV curable resin material is employed. With a UV curable resin material, a UV light irradiation device may be used to cure the resin material. With a thermocurable resin material, a heating device may be used to cure the material. With an air-dry hardening material, a decompressor may be used to harden the material.

Examples of the UV curable resin include an acrylic resin, an acrylic epoxy resin, an acrylic urethane resin, an acrylic polyester resin, and an acrylic silicone resin, and examples of the thermocurable resin which may be used include a phenol resin, an epoxy resin, a urethane resin, a urea resin, a melamine resin, a silicone resin, an unsaturated polyester resin, a polyurethane resin, a polyimide resin, and a fluorine resin. Those UV curable resins and thermocurable resins may also be used as air-dry hardening resin materials.

In addition, examples of the solvent which may be used include: cetyl alcohol, stearyl alcohol, oleyl alcohol, octyl alcohol, decyl alcohol, lauryl alcohol, tridecyl alcohol (tridecanol), n-butyl alcohol, cyclohexyl alcohol, and 2-methylcyclohexyl alcohol; alkyl ethers such as methyl cellosolve, ethyl cellosolve, butyl cellosolve, butyl carbitol, cellosolve acetate, butyl cellosolve acetate, carbitol acetate, and butyl carbitol acetate; aromatic hydrocarbons such as toluene, xylene, and tetralin; and ketones such as cyclohexanone, methyl cyclohexanone, isophorone, and diacetone alcohol. However, the solvent is not limited thereto, and any appropriate solvent may be selected taking the printability and workability into consideration. In addition, alcohols or esters, such as butyl cellosolve, ethyl carbitol, butyl cellosolve acetate, butyl carbitol acetate, and terpineol, may also be used in combination.

In addition, a (meth)acrylic monomer may be used instead of the above-mentioned solvent. With regard to the (meth)acrylic monomer, as monomers having one photopolymerizable unsaturated bond in the molecule, there are exemplified (meth)acrylates such as 2-hydroxyethyl(meth)acrylate, glycidyl(meth)acrylate, bis-glycidyl(meth)acrylate, dimethylaminoethyl(meth)acrylate, polyethylene glycol di(meth)acrylate, trimethylol propane tri(meth)acrylate lauryl(meth)acrylate, stearyl(meth)acrylate, benzyl(meth)acrylate, methyl(meth)acrylate, ethyl(meth)acrylate propyl(meth)acrylate, butyl(meth)acrylate hexyl(meth)acrylate, octyl(meth)acrylate, and a phosphorous-containing (meth)acrylate, and N-cyclohexyl maleimide, N-2-methylhexyl maleimide, N-2-ethylcyclohexyl maleimide, N-2-chlorocyclohexyl maleimide, N-phenyl maleimide, N-2-methylphenyl maleimide, N-2-ethylphenyl maleimide, N-2-chlorophenyl maleimide, dicyclopentenyl(meth)acrylate, and dicyclopentenyloxyethyl(meth)acrylate.

In addition, as monomers having two or more photopolymerizable unsaturated bonds in the molecule, there are exemplified (meth)acrylates such as ethylene oxide (hereinafter, referred to as "EO") modified bisphenol A di(meth)acrylate, epichlorohydrin (hereinafter, referred to as "ECH") modified bisphenol A di(meth)acrylate, bisphenol A di(meth)acrylate 1,4-butanediol di(meth)acrylate, 1,3-butylene glycol di(meth)acrylate diethylene glycol di(meth)acrylate, glycerol di(meth)acrylate, neopentyl glycol di(meth)acrylate, EO modified di(meth)acrylate phosphate, ECH modified di(meth)acrylate phthalate, polyethylene glycol 400 di(meth)acrylate, polypropylene glycol 400 di(meth)acrylate, tetraethylene glycol di(meth)acrylate, ECH modified 1,6-hexanediol di(meth)acrylate, trimethylol propane tri(meth)acrylate, pentaerythritol tri(meth)acrylate, EO modified tri (meth)acrylate phosphate, EO modified trimethylol propane tri(meth)acrylate, propylene oxide (hereinafter, referred to as "PO") modified trimethylol propane tri(meth)acrylate, tris ((meth)acryloxyethyl) isocyanurate, pentaerythritol tetra(meth)acrylate, dipentaerythritol tetra(meth)acrylate, dipentaerythritol hexa(meth)acrylate, and dipentaerythritol penta(meth)acrylate. The above-mentioned (meth)acrylic monomers may be used alone or in combination.

Further, as a photopolymerization initiator in the case of using a UV curable resin, there are exemplified benzophenone, N,N'-tetraethyl-4,4'-diaminobenzophenone, 4-methoxy-4'-dimethylaminobenzophenone, benzil, 2,2-diethoxyacetophenone, benzoin, benzoin methyl ether, benzoin isobutyl ether, benzyl dimethyl ketal, α-hydroxyisobutylphenone, thioxanthone, 2-chlorothioxanthone, 1-hydroxycyclohexyl phenyl ketone, 2-methyl-1-[4-(methylthio)phenyl]-2-morpholino-1-propane, t-butylanthraquinone, 1-chloroanthraquinone, 2,3-dichloroanthraquinone, 3-chloro-2-methylanthraquinone, 2-ethylanthraquinone, 1,4-naphthoquinone, 9,10-phenanthraquinone, 1,2-benzoanthraquinone, 1,4-dimethylanthraquinone, 2-phenylanthraquinone, and 2-(o-chlorophenyl)-4,5-diphenylimidazole dimer. Those photopolymerization initiators may be used alone or in combination.

As a thermal polymerization initiator, there may be used a peroxide-based compound which, when heated, generates radicals acting as polymerization initiating species, and a sulfonium salt or an iodonium salt which generates a cation, for example. The same material as one used to form a protective layer 522, which is described later, may also be employed.

Figure 6C:
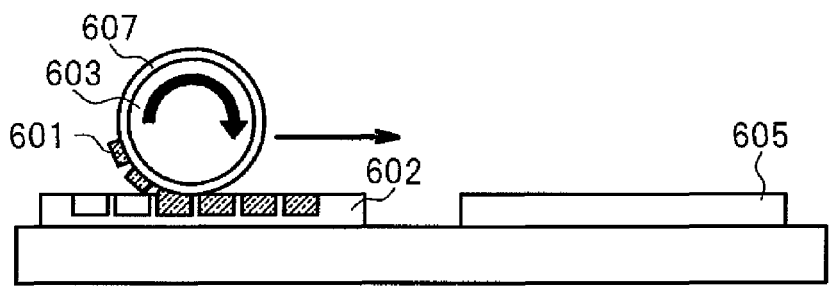
FIG. 6C is a diagram illustrating one of the steps of forming condenser lenses by intaglio offset printing.
Figure 6D:
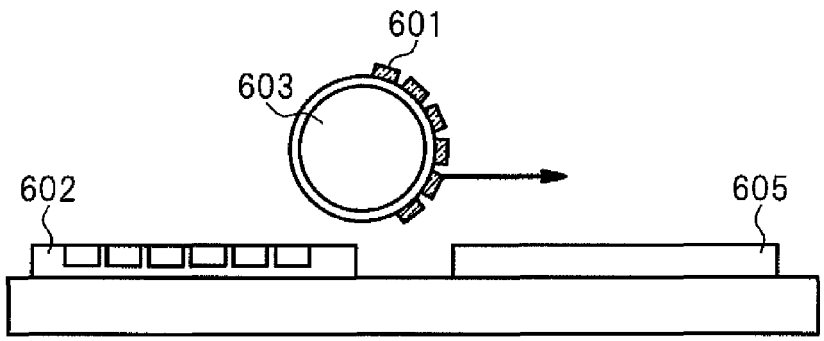
FIG. 6D is a diagram illustrating one of the steps of forming condenser lenses by intaglio offset printing.
Figure 6E:
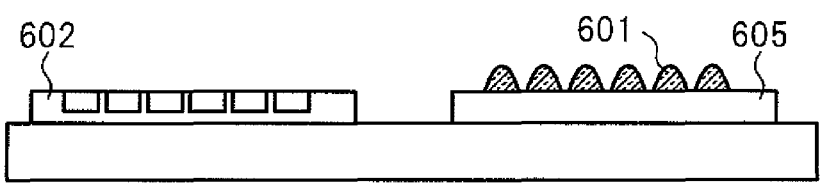
FIG. 6E is a diagram illustrating one of the steps of forming condenser lenses by intaglio offset printing.

Next, a transfer roller 603 with a blanket 607 wrapped around the circumference thereof is rolled over the intaglio 602 as illustrated in FIG. 6C to receive the lens material 601 with the blanket 607 in a manner illustrated in FIG. 6C. As illustrated in FIGS. 6D and 6E, the transfer roller 603 is further rolled over the liquid crystal panel 605, to thereby transfer the lens material 601 received with the transfer roller 603 onto the liquid crystal panel 605. The surface tension gives the lens material 601 on the liquid crystal panel a sectional shape that has a curvature. This roundness creates a lens effect.

Lastly, the lens material 601 on the top surface of the liquid crystal panel 605 is cured by UV light irradiation treatment or heat treatment, or treatment that combines the two, depending on what material is used as the lens material 601. The condenser lenses 509 having a desired pitch and height are thus formed.

In forming the condenser lenses, printing may be broken into a plurality of stages. For example, lens patterns are formed on the top surface of the liquid crystal panel 605 in the first stage of printing, and more lens patterns are formed between the existing lens patterns in the subsequent stage of offset printing. This way, the density of the condenser lenses 509 is made even higher.

The effects of the present invention may be obtained by any method as long as the method allows the condenser lenses 509 to be formed on the polarization layer 508, and ink jetting or photolithography may therefore be used as a condenser lens forming method. However, forming the condenser lenses 509 by offset printing such as the intaglio offset printing described in this embodiment or reverse offset printing is preferred because it causes less heat or chemical damage to the polarization layer 508 and the liquid crystal panel and the condenser lenses 509 may be formed with precision.

The condenser lenses 509 formed on the polarization layer 508 assume the role of the protective layer 522 of the polarization layer 508. Because it is sufficient if the polarization layer 508 is formed at least below the lenses, a part of the polarization layer 508 that have no lenses formed above may be etched away by water or a chemical with the formed lenses as a resist. The role of the lenses as the protective layer 522 of the polarization layer 508 may be consolidated by forming the lenses densely.

The steps of forming the polarization layer 508 and forming the condenser lenses 509 may be put before the dicing (FIG. 1, P-5) if the glass polishing step (FIG. 1, P-4) is finished first.

The present invention is not limited to the process steps described above, and the polarization layer forming step and the condenser lens forming step maybe executed at any point that follows the glass polishing step (FIG. 1, P-4) and precedes the backlight module mounting (FIG. 1, P-10). Further, another step may be inserted between the forming of the polarization layer 508 and the forming of the condenser lenses 509. However, considering the cleanliness of the substrate surface and damage to the polarization layer 508 in the process of forming the condenser lenses 509, the polarization layer 508 is preferred to be formed immediately before the forming of the condenser lenses 509. If the polarization layer forming step and the condenser lens forming step precede the dicing (FIG. 1, P-5), a plurality of liquid crystal panels may be formed at once on a large-sized substrate and the production efficiency is accordingly improved. However, the polarization layer 508 or the condenser lenses 509 in this case maybe damaged through the subsequent steps, and need to be protected in some cases.

Here, the configuration of the liquid crystal panel manufactured in the manufacturing method of this embodiment is described with reference to FIGS. 5 and 9. The condenser lenses 509 are provided in order to condense light from the backlight module 510 into transmissive display portions 401, which are transmissive apertures in the TFT substrate 507. The condenser lenses 509 are a plurality of cylindrical lenses which protrude toward the backlight.

As illustrated in FIG. 9, cylindrical lenses that form the condenser lenses 509 are provided so that the direction of the length of the cylinders coincides with the direction of the short side of the rectangular sub-pixels. In addition, one cylindrical lens is provided per column in the direction of the short side in the pixel regions. In other words, the center of the protrusions of the cylinders coincides with the center line of the pixel columns, as illustrated by the arrow P of FIG. 9. In the case where the lenses are selected to have an appropriate form so that the center of the protrusions of the cylinders coincides with the center line of the transmissive display portion, light which would otherwise enter the reflective display portion 404 and wire portions may be condensed in the transmissive display portions. Thus, the backlight may be used effectively.

Here, there are no limitations to the form of the condenser lenses 509, and the lenses are not limited to being cylindrical, as long as they efficiently condense light in transmissive regions. Any form that allows light from the backlight to be guided to the light transmitting portions is possible, and spherical lenses and concave lenses maybe used, for example. In addition, the arrangement of the lenses is not limited to the above, and any arrangement is possible for implementing the present invention, as long as it has satisfactory performance.

In this embodiment, a liquid crystal display device for a portable apparatus and a manufacturing method therefor are described, and the present invention may also be applied to transmissive liquid crystal display devices having no reflective display portion 404, as well as to liquid crystal panels for applications other than portable apparatuses, such as televisions and car navigation. In addition, the present embodiment may be applied to various liquid crystal devices, such as, for example, twisted nematic (TN) devices, in-place switching (IPS) devices, or vertical alignment (VA) devices. In the case of other devices, the configuration of the elements, the form of the elements, the manufacturing method, and the materials may be completely different. However, whatever the type of device, the effects of the present invention may be attained for any device, when a polarizing layer 508 containing a dichroic dye with heliotropic liquid crystal properties is formed on the outer surface of the substrate before forming the condenser lenses.

Second Embodiment

Figure 7:
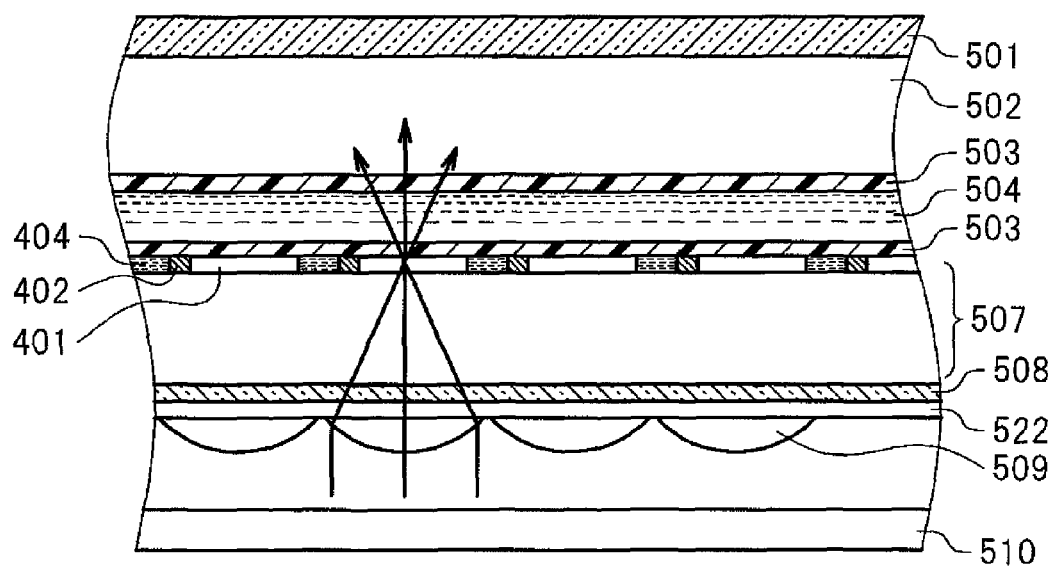
FIG. 7 is a sectional view illustrating a liquid crystal display device according to a second embodiment of the present invention.

According to this embodiment, a step of forming a protective layer (resin layer) is added after the step of forming the polarization layer 508 and before the step of forming the condenser lenses 509 in the process steps of the first embodiment. A process flow of this embodiment is illustrated in FIG. 10, and a sectional view of a liquid crystal display device manufactured by the method of this embodiment is illustrated in FIG. 7.

Figure 10:
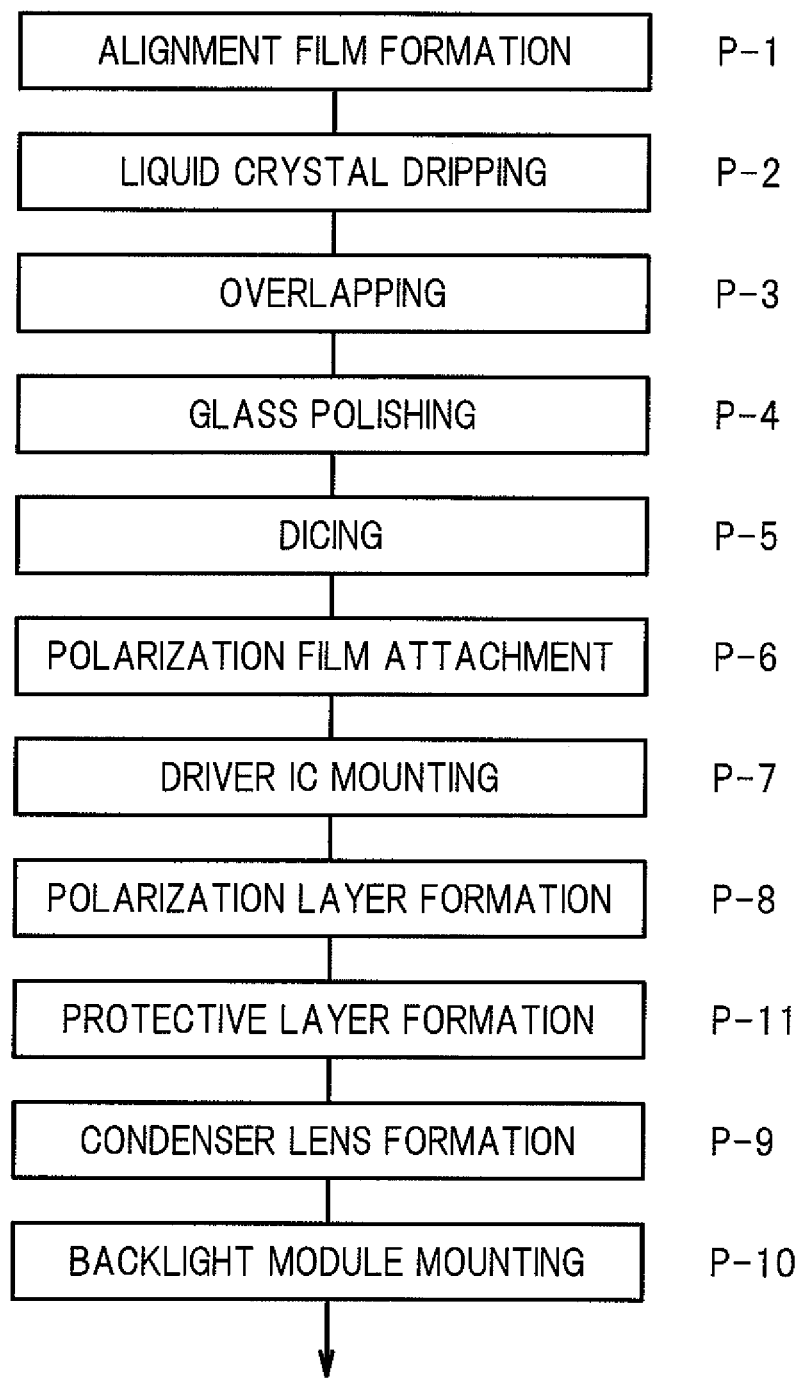
FIG. 10 is a process flow diagram illustrating a manufacturing method for the liquid crystal display device according to the second embodiment of the present invention.

In this embodiment, the TFT substrate 507 and the color filter substrate 502 are polished on outer surfaces to reduce the thickness of each substrate to 149.2 μm (FIG. 10, P-14), and then cut into panels of given size (FIG. 10, P-5). The polarization film 501 is stuck to the outer surface of the color filter substrate 502 (FIG. 10, P-6), and components such as the driver IC 203 and the flexible printed circuit board 204 are mounted (FIG. 10, P-7). The polarization layer 508 is then formed from a dichroic dye that has lyotropic liquid crystal properties to a thickness of 0.3 μm (FIG. 10, P-8). After that, the protective layer 522 is formed on the polarization layer 508 by intaglio offset printing (FIG. 10, P-11). The protective layer 522 is formed from a material that is a mixture of an acrylic monomer and a photoreaction initiator such that the protective layer 522 after cured has a thickness of 0.5 μm and a transmittance of 98% or more and 100% or less in a visible light range (at a wavelength of 400 nm to 800 nm). The thickness of the protective layer 522 is not limited thereto, but needs to be in accordance with optical design, with the glass polishing step and the polarization layer forming step taken into account.

The protective layer 522 may be formed by other offset printing methods or other printing methods such as flexographic printing and screen printing, or by a spin coater, a slit spin coater, ink jetting, or a slit coater.

The material for forming the protective layer 522 may be another photo (ultraviolet ray) curable resin material, a thermocurable resin material, an insulating film made of silicon nitride or the like, or a transparent conductive oxide film made of indium tin oxide or the like.

Examples of the UV curable resin include an acrylic resin, an acrylic epoxy resin, an acrylic urethane resin, an acrylic polyester resin, and an acrylic silicone resin, and examples of the thermocurable resin which may be used include a phenol resin, an epoxy resin, a urethane resin, a urea resin, a melamine resin, a silicone resin, an unsaturated polyester resin, a polyurethane resin, a polyimide resin, and a fluorine resin. In addition, a phosphorous-doped silicate based resin, a methyl siloxane based resin, or a high methyl siloxane based resin may also be used as the material. Those may be used alone or in combination of two or more.

With regard to the (meth)acrylic monomer, as monomers having one photopolymerizable unsaturated bond in the molecule, there are exemplified (meth)acrylates such as 2-hydroxyethyl(meth)acrylate glycidyl(meth)acrylate, bis-glycidyl (meth)acrylate, dimethylaminoethyl(meth)acrylate, polyethylene glycol di(meth)acrylate, trimethylol propane tri (meth)acrylate, lauryl(meth)acrylate, stearyl(meth)acrylate, benzyl(meth)acrylate, methyl(meth)acrylate, ethyl(meth) acrylate, propyl(meth)acrylate, butyl(meth)acrylate, hexyl (meth)acrylate, octyl(meth)acrylate, and a phosphorous-containing (meth)acrylate, and N-cyclohexyl maleimide, N-2-methylhexyl maleimide, N-2-ethylcyclohexyl maleimide, N-2-chlorocyclohexyl maleimide, N-phenyl maleimide, N-2-methylphenyl maleimide, N-2-ethylphenyl maleimide, N-2-chlorophenyl maleimide, dicyclopentenyl(meth)acrylate, and dicyclopentenyloxyethyl(meth)acrylate.

In addition, as monomers having two or more photopolymerizable unsaturated bonds in the molecule, there are exemplified (meth)acrylates such as ethylene oxide (hereinafter, referred to as "EO") modified bisphenol A di(meth)acrylate, epichlorohydrin (hereinafter, referred to as "ECH") modified bisphenol A di(meth)acrylate, bisphenol A di(meth)acrylate, 1,4-butanediol di(meth)acrylate, 1,3-butylene glycol di(meth)acrylate, diethylene glycol di(meth)acrylate, glycerol di(meth)acrylate, neopentyl glycol di(meth)acrylate, EO modified di(meth)acrylate phosphate, ECH modified di(meth)acrylate phthalate, polyethylene glycol 400 di(meth) acrylate, polypropylene glycol 400 di(meth)acrylate, tetraethylene glycol di(meth)acrylate, ECH modified 1,6-hexanediol di(meth)acrylate, trimethylol propane tri(meth) acrylate, pentaerythritol tri(meth)acrylate, BO modified tri (meth)acrylate phosphate, EO modified trimethylol propane tri(meth)acrylate, propylene oxide (hereinafter, referred to as "PO") modified trimethylol propane tri(meth)acrylate, tris ((meth)acryloxyethyl) isocyanurate, pentaerythritol tetra (meth)acrylate, dipentaerythritol tetra(meth)acrylate, dipentaerythritol hexa(meth)acrylate, and dipentaerythritol penta (meth)acrylate. The above-mentioned (meth)acrylic monomers may be used alone or in combination.

Further, as photoinitiator, there are exemplified benzophenone, N,N'-tetraethyl-4,4'-diaminobenzophenone, 4-methoxy-4'-dimethylaminobenzophenone, benzil, 2,2-diethoxyacetophenone, benzoin, benzoin methyl ether, benzoin isobutyl ether, benzyl dimethyl ketal, α-hydroxyisobutylphenone, thioxanthone, 2-chlorothioxanthone, 1-hydroxycyclohexyl phenyl ketone, 2-methyl-1-[4-(methylthio)phenyl]-2-morpholino-1-propane, t-butylanthraquinone, 1-chloroanthraquinone, 2,3-dichloroanthraquinone, 3-chloro-2-methylanthraquinone, 2-ethylanthraquinone, 1,4-naphthoquinone, 9,10-phenanthraquinone, 1,2-benzoanthraquinone, 1,4-dimethylanthraquinone, 2-phenylanthraquinone, and 2-(o-chlorophenyl)-4,5-diphenylimidazole dimer. Those photoinitiators may be used alone or in combination.

In addition, examples of the solvent which may be used include: cetyl alcohol, stearyl alcohol, oleyl alcohol, octyl alcohol, decyl alcohol, lauryl alcohol, tridecyl alcohol (tridecanol), n-butyl alcohol, cyclohexyl alcohol, and 2-methylcyclohexyl alcohol; alkyl ethers such as methyl cellosolve, ethyl cellosolve, butyl cellosolve, butyl carbitol, cellosolve acetate, butyl cellosolve acetate, carbitol acetate, and butylcarbitol acetate; aromatic hydrocarbons such as toluene, xylene, and tetralin; and ketones such as cyclohexanone, methyl cyclohexanone, isophorone, and diacetone alcohol. However, the solvent is not limited thereto, and any appropriate solvent may be selected taking the printability and workability into consideration. In addition, alcohols or esters, such as butyl cellosolve, ethyl carbitol, butyl cellosolve acetate, butyl carbitol acetate, and terpineol, may also be used. However, heating may degrade the degree of polarization, optical characteristics, and film quality of the polarization layer 508, depending on the material and deposition condition of the polarization layer 508. In view of reducing the damage to the polarization layer 508, photo curable resin may be preferred as the material of the protective layer 522.

An additive for improving the wettability with respect to the polarization layer 508 and the substrate, an additive for improving the levelness, and an additive for adjusting viscosity or thixotropic properties may be added to the material of the protective layer 522. The same material as the lens material described above may also be used.

By forming the protective layer 522, the polarization layer 508 is protected and at the same time a homogeneous surface suitable for forming lenses is created. In addition, the thickness of the protective layer 522 may be controlled during application. Inconsistency in amount of glass polished which may occur during glass polishing may therefore be corrected by adjusting the thickness of the protective layer 522 according to the amount of inconsistency. The distance from the condenser lenses 509 to the apertures in the TFT substrate is thus kept constant.

When the liquid crystal panel is assembled into a liquid crystal display device, light from the backlight which is transmitted through the protective layer 522 is lost if the transmittance of the protective layer 522 is low. Further, if stained, the protective layer 522 impairs the color reproducibility of the liquid crystal display device. It is therefore concluded that the transmittance of the protective layer 522 in the visible light range is preferred to be high, desirably, 90% or more.

The steps of forming the polarization layer 508 and forming the condenser lenses 509 and the step of forming the protective layer 522 maybe put before the dicing (FIG. 10, P-5) if the glass polishing step (FIG. 10, P-4) is finished first. The present invention is not limited thereto, and the polarization layer forming step, the condenser lens forming step, and the protective layer forming step may be executed at any point that follows the glass polishing step (FIG. 10, P-4) and precedes the backlight module mounting (FIG. 10, P-10). Further, another step may be inserted between the forming of the polarization layer 508 and the forming of the condenser lenses 509. However, considering the cleanliness of the substrate surface and damage to the polarization layer 508 in the process of forming the condenser lenses 509, the forming of the polarization layer 508 to the forming of the condenser lenses 509 are preferred to be executed in succession.

Third Embodiment

Figure 8A:
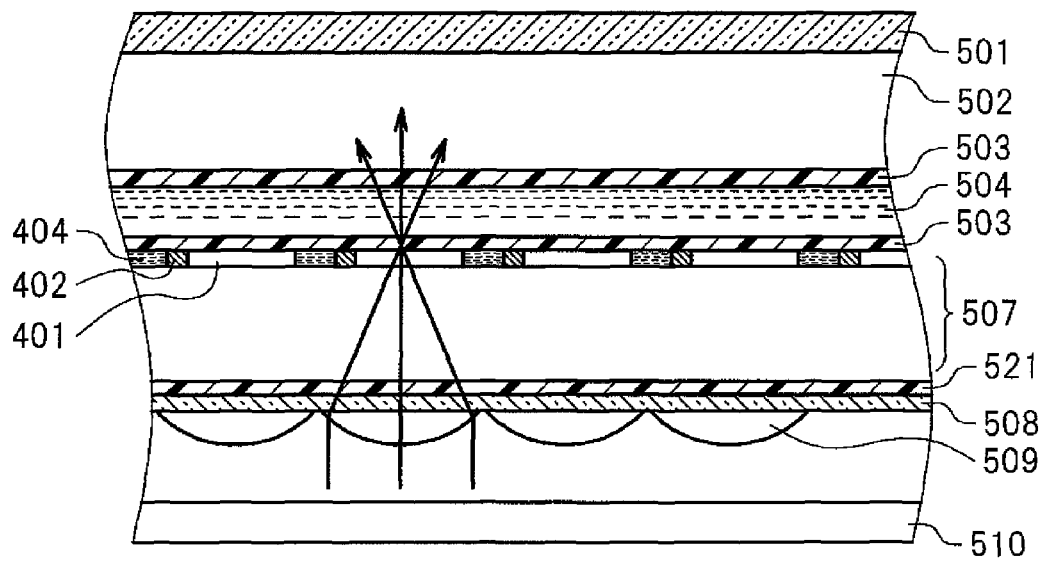
FIG. 8A is a sectional view illustrating a liquid crystal display device according to a third embodiment of the present invention.
Figure 11:
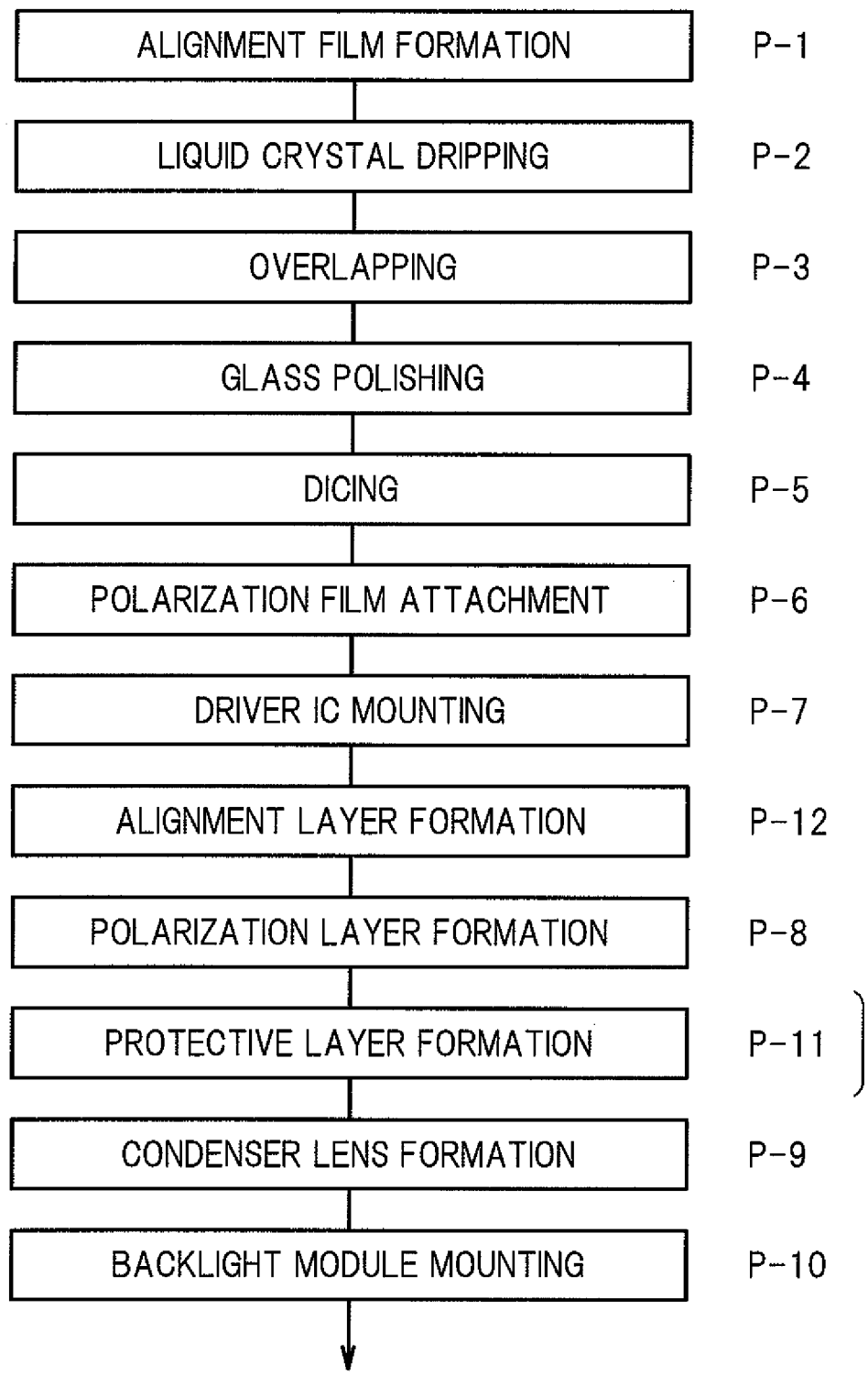
FIG. 11 is a process flow diagram illustrating a manufacturing method for the liquid crystal display device according to the third embodiment of the present invention.

According to this embodiment, a step of forming an alignment layer 521 is added before the step of forming the polarization layer 508 in the process steps of the first embodiment. The alignment layer 521 is for inducing the alignment of the dichroic dye having lyotropic liquid crystal properties which is the material of the polarization layer 508. The process flow of this embodiment is that of FIG. 11 minus the protective layer forming step (FIG. 11, P-11). A sectional view of a liquid crystal display device manufactured by the method of this embodiment is illustrated in FIG. 8A.

In this embodiment, after the step of mounting the driver IC 203, the flexible printed circuit board 204, and other components (FIG. 11, P-7), and before the forming of the polarization layer 508 (FIG. 11, P-8), a flat layer is formed by ink jetting from a material that contains an acrylic monomer and a photoreaction initiator, and a rubbing process in which a surface of the flat layer is rubbed with a roller wrapped in cloth is performed to form the alignment layer 521.

The alignment layer 521 may be formed by other methods than ink jetting, as long as a flat film is formed. Offset printing, flexographic printing, screen printing, a spin coater, a slit spin coater, or a slit coater may be employed to form the alignment layer 521.

The aligning method of the alignment layer 521 is not limited to the rubbing method used in this embodiment, and may instead be ultraviolet ray irradiation, ion beam irradiation, or oblique evaporation.

The material of the alignment layer 521 may be polyimide or polyamide, which is commonly used in an alignment film for liquid crystal. A material appropriate for the aligning method employed by the alignment layer 521 is used. A monomolecular film or the like may be formed instead of forming the alignment layer 521 as a thick layer. However, in the case where a film to be formed as the alignment layer 521 requires heating, the forming of the film is preferred to precede the attaching of the polarization film. Further, an alignment process may be performed directly on the outer surface of the TFT substrate instead of forming a thick layer or a monomolecular film as the alignment layer 521.

Various thicknesses may thus be chosen for the alignment layer 521. Accordingly, the substrate thickness after glass polishing, the alignment film thickness, and the thickness of the polarization layer 508 are preferred to be determined in view of optical design of the lenses.

The steps of forming the alignment layer 521 and forming the polarization layer 508 and the step of forming the condenser lenses 509 may be put before the dicing (FIG. 11, P-5) if the glass polishing step (FIG. 11, P-4) is finished first. The present invention is not limited thereto, and the alignment layer forming step, the polarization layer forming step, and the condenser lens forming step may be executed at any point that follows the glass polishing step (FIG. 11, P-4) and precedes the backlight module mounting (FIG. 11, P-10). Further, another step maybe inserted between the forming of the alignment layer 521 and the forming of the condenser lenses 509. However, considering the cleanliness of the substrate surface and damage to the alignment layer 521 and to the polarization layer 508 in the process of forming the condenser lenses 509, the forming of the alignment layer 521 to the forming of the condenser lenses 509 are preferred to be executed in succession.

By forming the alignment layer 521 in the manner described above, the dichroic dye having lyotropic liquid crystal properties is readily aligned and the optical performance of the polarization layer 508 is improved.

Fourth Embodiment

Figure 8B:
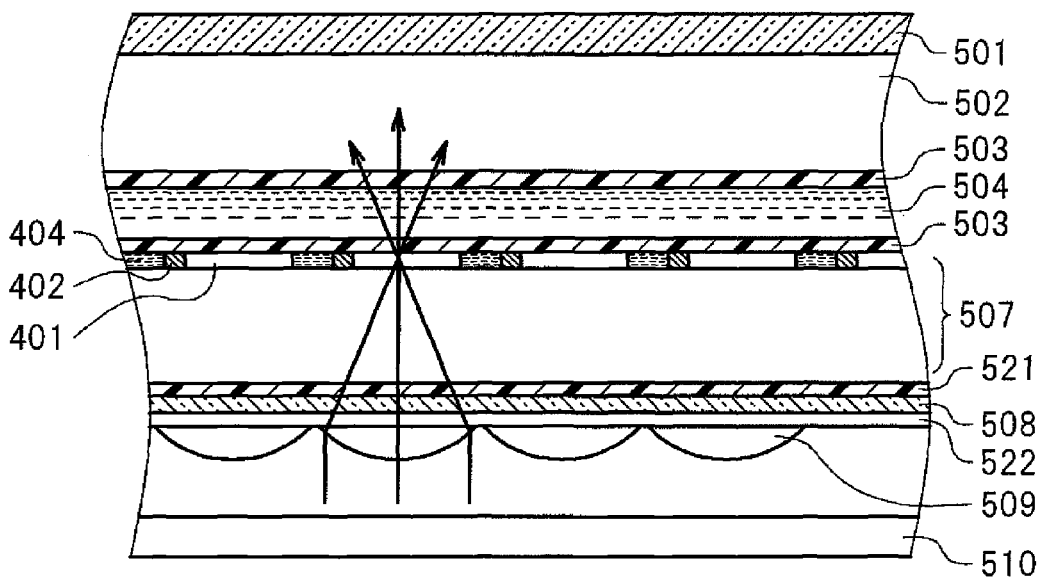
FIG. 8B is a sectional view illustrating a liquid crystal display device according to a fourth embodiment of the present invention.

According to this embodiment, a step of forming an alignment layer 521 is added before the step of forming the polarization layer 508 in the process steps of the second embodiment. The alignment layer 521 is for inducing the alignment of the dichroic dye having lyotropic liquid crystal properties which is the material of the polarization layer 508. The process flow of this embodiment is illustrated in FIG. 11. A sectional view of a liquid crystal display device manufactured by the method of this embodiment is illustrated in FIG. 8B.

In this embodiment, after the step of mounting the driver IC 203, the flexible printed circuit board 204, and other components (FIG. 11, P-7), and before the forming of the polarization layer 508 (FIG. 11, P-8), a flat layer is formed by ink jetting from a material that contains an acrylic monomer and a photoreaction initiator, and a rubbing process in which a surface of the flat layer is rubbed with a roller wrapped in cloth is performed to form the alignment layer 521.

The alignment layer 521 may be formed by other methods than ink jetting, as long as a flat film is formed. Offset printing, flexographic printing, screen printing, a spin coater, a slit spin coater, or a slit coater may be employed to form the alignment layer 521.

The aligning method of the alignment layer 521 is not limited to the rubbing method used in this embodiment, and may instead be ultraviolet ray irradiation, ion beam irradiation, or oblique evaporation.

The material of the alignment layer 521 may be polyimide or polyamide, which is commonly used in an alignment film for liquid crystal. A material appropriate for the aligning method employed by the alignment layer 521 is used. A monomolecular film or the like may be formed instead of forming the alignment layer 521 as a thick layer. However, in the case where a film to be formed as the alignment layer 521 requires heating, the forming of the film is preferred to precede the attaching of the polarization film. Further, an alignment process may be performed directly on the outer surface of the TFT substrate instead of forming a thick layer or a monomolecular film as the alignment layer 521.

Various thicknesses may thus be chosen for the alignment layer 521. Accordingly, the substrate thickness after glass polishing, the alignment film thickness, the thickness of the polarization layer 508, and the thickness of the protective layer 522 are preferred to be determined in view of optical design of the lenses.

The steps of forming the alignment layer 521 and forming the polarization layer 508, the step of forming the condenser lenses 509, and the step of forming the protective layer 522 may be put before the dicing (FIG. 11, P-5) if the glass polishing step (FIG. 11, P-4) is finished first. The present invention is not limited thereto, and the alignment layer forming step, the polarization layer forming step, the condenser lens forming step, and the protective layer forming step may be executed at any point that follows the glass polishing step (FIG. 11, P-4) and precedes the backlight module mounting (FIG. 11, P-10). Further, another step may be inserted between the forming of the alignment layer 521 and the forming of the condenser lenses 509. However, considering the cleanliness of the substrate surface and damage to the alignment layer 521 and to the polarization layer 508 in the process of forming the condenser lenses 509, the forming of the alignment layer 521 to the forming of the condenser lenses 509 are preferred to be executed in succession.

By forming the alignment layer 521 in the manner described above, the dichroic dye having lyotropic liquid crystal properties is readily aligned and the optical performance of the polarization layer 508 is improved.

The present invention has now been described through embodiments. However, the structures described in the embodiments are merely examples and the present invention may be modified suitably to the extent that does not depart from its technical concept. Further, the structures described in the embodiments may be used in combination as long as the combined structures do not contradict each other.

What is claimed is:
1. A liquid crystal display device, comprising:
   a first substrate and a second substrate opposed to each other;
   a liquid crystal configured to fill a space between the first substrate and the second substrate;
   a polarization layer formed by application on a surface of the first substrate opposite from the liquid crystal;
   a resin layer made of a photo curable resin formed on a surface of the polarization layer opposite from the first substrate;
   a condenser lens, distinct from the resin layer, formed on a surface of the resin layer opposite from the polarization layer; and
   an illumination device;
   wherein the illumination device is configured to irradiate the liquid crystal with light through the condenser lens, and is disposed closer to the first substrate with respect to the liquid crystal; and
   wherein the illumination device has a ray of light collimated so that an angle at which light intensity of the ray of light is 50% is within ±15° with respect to at least one axis.

2. The liquid crystal display device according to claim 1, wherein the polarization layer includes a dichroic dye that has lyotropic liquid crystal properties.

3. The liquid crystal display device according to claim 1, further comprising:
   an alignment layer configured to perform an alignment of the polarization layer, formed between the first substrate and the polarization layer.

4. The liquid crystal display device according to claim 1, wherein the condenser lens is formed by offset printing.

5. The liquid crystal display device according to claim 1, wherein the polarization layer has a layer thickness in the range of 0.01 μm to 10 μm, inclusive.

6. A method of manufacturing a liquid crystal display device, the liquid crystal display device including
   a first substrate and a second substrate opposed to each other,
   a liquid crystal configured to fill a space between the first substrate and the second substrate, and
   an illumination device,
   the method comprising:
   forming a polarization layer on a surface of the first substrate opposite from the liquid crystal by applying and curing a polarization layer material;
   forming a resin layer by applying a photo-curable resin onto the polarization layer, and curing the photo-curable resin; and
   forming a condenser lens, distinct from the resin layer, on a surface of the resin layer opposite from the polarization layer;
   wherein the illumination device is configured to irradiate the liquid crystal with light through the condenser lens, and is disposed closer to the first substrate with respect to the liquid crystal; and
   wherein the illumination device has a ray of light collimated so that an angle at which light intensity of the ray of light is 50% is within ±15° with respect to at least one axis.

7. The method of manufacturing a liquid crystal display device according to claim 6, wherein the polarization layer includes a dichroic dye that has lyotropic liquid crystal properties.

8. The method of manufacturing a liquid crystal display device according to claim 6, further comprising:
   forming an alignment layer on a surface of the first substrate opposite from the liquid crystal, before the forming the polarization layer,
   wherein the polarization layer is formed on the alignment layer.

9. The method of manufacturing a liquid crystal display device according to claim 6, wherein the condenser lens is formed by offset printing.

10. The method of manufacturing a liquid crystal display device according to claim 7, wherein the condenser lens is formed by offset printing.

11. The method of manufacturing a liquid crystal display device according to claim 6, wherein the polarization layer has a layer thickness in the range of 0.01 μm to 10 μm, inclusive.

12. The liquid crystal display device according to claim 1, wherein the resin layer and the condenser lens are not made from the same material.

13. The liquid crystal display device according to claim 1, wherein the condenser lens includes a cylindrical lens.

14. The liquid crystal display device according to claim 1, wherein the condenser lens includes a plurality of cylindrical lenses.

15. The liquid crystal display device according to claim 14, wherein the cylindrical lenses are disposed so as to extend along with a direction of the short side of a rectangular sub-pixels of the liquid crystal display device.

16. The liquid crystal display device according to claim 14, wherein the cylindrical lenses are respectively disposed as columns in a direction of the short side in a pixel region of the liquid crystal display device.

17. The method of manufacturing a liquid crystal display device according to claim 6, wherein the resin layer and the condenser lens are not made from the same material.

\* \* \* \* \*